Oct. 11, 1932.  F. J. KUBLER  1,881,693
PILLAR CONSTRUCTION FOR CLOSED VEHICLES
Filed March 14, 1928
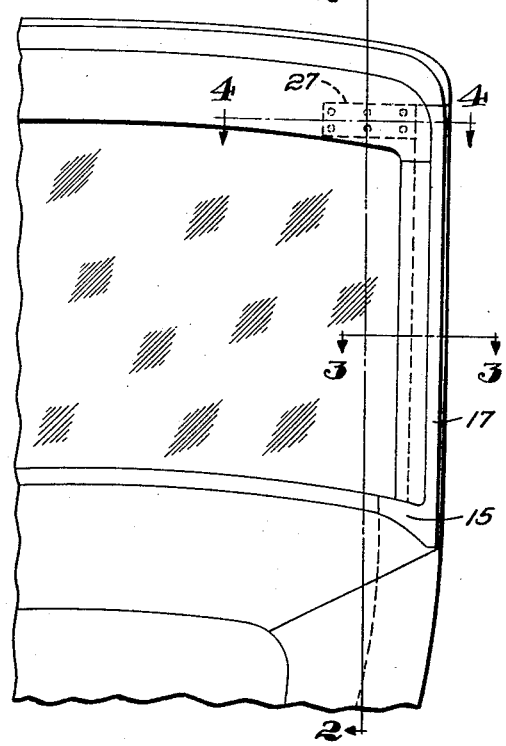
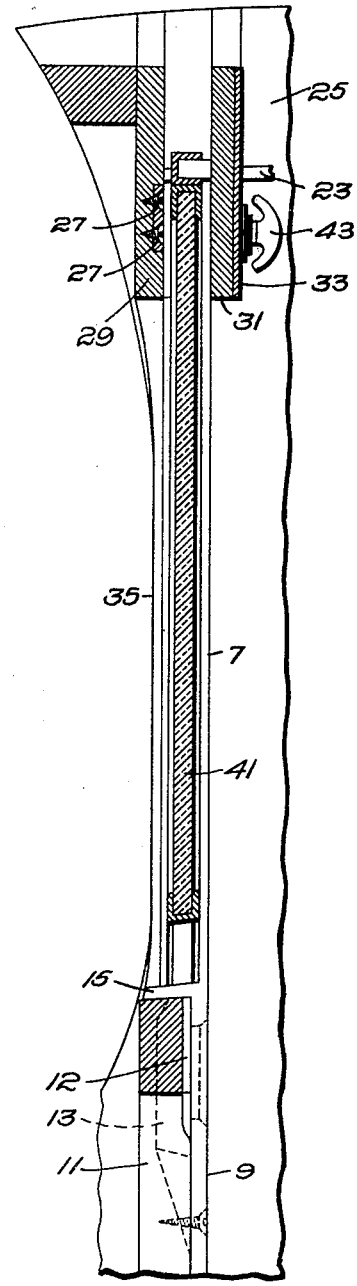
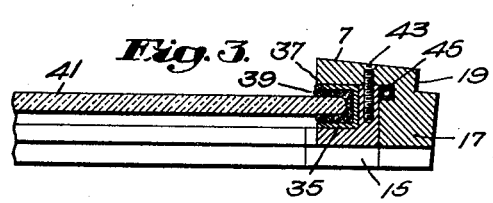
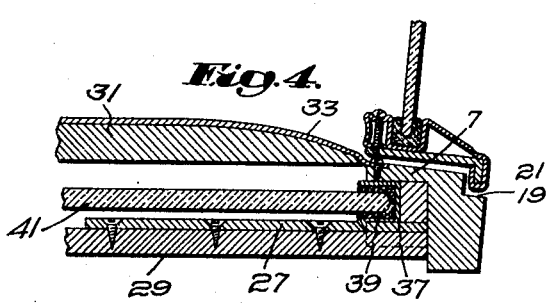
Inventor:
Frederick J. Kubler
by Emery, Booth, Janney & Varney
Attys Patented Oct. 11, 1932

1,881,693

UNITED STATES PATENT OFFICE

FREDERICK J. KUBLER, OF NEW YORK, N. Y., ASSIGNOR TO A. S. CAMPBELL COMPANY, OF EAST BOSTON, MASSACHUSETTS, A CORPORATION OF MASSACHUSETTS

PILLAR CONSTRUCTION FOR CLOSED VEHICLES

Application filed March 14, 1928. Serial No. 261,533.

This invention relates to vehicles of the closed type (whether permanently closed or convertible) wherein the corner assemblies adjacent the cowl and in the field of the driver's vision are of restricted dimension; preferably less in width than the distance between the eyes as described in the patent to Emond 1,622,098, March 22, 1927. The object is to provide such a construction for incorporation in a vehicle having a windshield of the vertically sliding type, the construction being of adequate strength and having various advantages in production and use as will appear to those skilled in the art from the detailed description of the illustrative embodiment thereof which I am about to give.

The construction of such illustrative embodiment will be well understood from the following description taken in connection with the accompanying drawing, wherein:

Fig. 1 is a partial front elevation of an automotive vehicle, the nigh corner being shown;

Fig. 2 is a section on the line 2—2 of Fig. 1 on an enlarged scale and showing the off standing post or stanchion in elevation.

Fig. 3 is a section on the line 3—3 of Fig. 1 on an enlarged scale; and

Fig. 4 is a section on the line 4—4 of Fig. 1 on a similar scale.

By way of example I have herein illustrated a closed body of the composite type wherein the standing pillars or staunchions at the cowl above the belt are made of metal. These pillars may each include a body portion of suitable tough metal, preferably a drop forging, comprising a substantial transverse web 7, the lower portion of which is extended downwardly (see Fig. 2) to form a suitable anchor at 9, permitting it to be secured to the rear face of the vertical frame member 11 at the cowl while an integral lateral arm 12 may be secured to the cowl bar. At the belt the piller may have a forwardly projecting box-like reinforcement 13 which may also provide a mortise receiving the leaves of a door hinge. Forwardly projecting from the web I preferably provide a generally horizontal flange 15 which overlies and receives underriding support from the frame member 11. The post is further reinforced (see Fig. 3) by a forwardly projecting integral rib 17, the lower end of which merges into said flange 15, thus effectively tying all said parts together in a rigid structure. The rib 17 defines with the inner portion of the web 7 a forwardly opening rabbet, the rear wall of which, provided by the web 7, forms a back support for the windshield. At the outer rear corner of the post a rabbet 19 may be provided, if desired, to receive the overlap flange 21 of the door (see Fig. 4). At the upper end of the post it may be provided with an arm 23 (Fig. 2) by means of which it may be anchored to the longitudinally extending top rail of the body and it may also have welded thereto an arm 27 (see Figs. 2 and 4) on which is carried a transverse member 29 defining the front wall of a header adjacent the roof of the vehicle into which the windshield slides when raised. The rear wall of this header may be defined by a transverse member 31 supported from the inner rear edge of web 7 by the metallic fish-plates 33.

The contour of the post as a whole is completed in cooperation with said body portion comprising the web 7 and rib 17 by a separable member 35 which is preferably an aluminum die-casting. This member 35 may be generally L-shaped in section, as indicated in Fig. 3, and has a suitable exterior contour, as indicated in Fig. 2, to harmonize with the body member in accordance with the desired design of the vehicle. One arm of the L may fit into the corner of the rabbet defined by the web 7 and the rib 17 and the other arm thereof may then extend flush with the forward face of said rib 17 or be otherwise disposed relative thereto to complete its contour and form a harmonious design therewith and it opposes the inner portion of the web 7 to define in cooperation therewith a channel. The member 35 may, as indicated in Fig. 2, seat at its lower end on the flange 15 and at its upper end may, if desired, underride and support the cross member 29. Received within the angle of the member 35 there may be provided a sheet metal channel 37 of the usual type lined with felt 39 in which slides the glass 41 of the windshield. The section 35 is secured to the main body of the post and for this purpose I preferably utilize screws 43 extending in through the rear face of the web 7 and tapping into the rearwardly extending flange of section 35. It will be noticed that such fastenings do not intersect the outer exposed face of the post as a whole.

The sections 35 may be readily assembled, each as a part of a post, without the glass 41 to permit painting of the job, all parts at the same time and in a uniform and satisfactory manner. To insert the glass it is placed in its channels assembled with the sections 35 and the whole inserted from the front of the vehicle. The sections are secured in place and the glass 41 is then supported in alignment with the opening in the header formed by the walls 29 and 31, and may be hoisted by means of the handle 43 in the manner indicated in Fig. 3, the edges of the glass sliding in said channels and its upper part raising into the space between said walls.

By assembling the sliding windshield from the front as described I provide in the post as a whole the unbroken and substantial web 7, conveniently of tough metal such as a drop forging, and provide for its secure anchorage in the framework of the vehicle by means of the extension 9 while at the same time the structure may be made of small dimension; for instance, the apparent width of the post and the adjacent door pillar or stile may be perhaps 2⅜ inches. The member 35 is of such construction and nature as to appear as a unitary part of the post and may be of such substantial construction as to contribute to the strength of the standing posts or pillars as a whole.

Referring to Fig. 3, the piping 45 for the windshield wiper may be housed between the meeting faces of the sections of the post, and I have here shown a suitable groove formed in the body portion to receive the same. It will be understood that adjacent the cowl and adjacent the roof the piping may pass through suitable openings provided therefor. If for any purpose the piping needs replacement or repair, obviously, with the section 35 removed laterally, as it may be without disturbing the roof structure or parts at the cowl, access may be had to the greater portion of the length of this piping, and if it is necessary to remove it or replace it, this can readily be accomplished as it will have to be threaded at most only through short passages at the upper and lower ends of the post and is exposed for the major portion of its length.

I have described in detail the particular embodiment of my invention shown by way of example in the accompanying drawing. It will be understood, however, that the particular construction is merely an example and that the invention might be embodied in differing forms without departing from the essential principles thereof, and what I claim as new and desire to secure by Letters Patent I shall express in detail in the following claims.

I claim:

1. In a vehicle body of the closed type having a sliding windshield, top-supporting posts, each comprising a metallic body portion having a transversely disposed web portion, a header at the upper ends thereof comprising front and rear walls defining between them a space into which a portion of the windshield may slide and opening forwardly of said web portions, the windshield adapted to overlie the said web portions from the front, said posts also comprising separable sections at the front thereof completing the contour thereof and having portions overlying the edges of the windshield to confine it rearwardly toward said webs and in alignment with the space in said header.

2. In a vehicle body of the closed type having a sliding windshield, top-supporting posts, each comprising a metallic body portion having a transversely disposed web and a forwardly projecting reinforcing rib defining a rabbet into which the windshield may be inserted from the front, a header at the upper ends of the posts comprising front and rear walls defining between them a space into which a portion of the windshield may move opening forwardly of said web portions, said posts also comprising at the front thereof separable sections completing the contour of the post, said sections seated against said rib and having flanges overlying the edges of the windshield to confine it rearwardly toward said webs and in alignment with the space in said header.

3. In a vehicle body of the closed type having a sliding windshield, top-supporting posts, each comprising a metallic body portion having a transversely disposed web and a forwardly projecting reinforcing rib refining a rabbet into which the windshield may be inserted from the front, a header at the upper ends of the posts comprising front and rear walls defining between them a space into which a portion of the windshield may move opening forwardly of said web portions, and open-ended angles embracing the edges of the windshield and with it being received in said rabbets and removably secured therein, the exposed surfaces of said angles forming a portion of the contour of the post as a whole.

4. In a vehicle body of the closed type having a sliding windshield, top-supporting posts, each comprising a metallic body portion having a transversely disposed web and a forwardly projecting reinforcing rib defining a rabbet into which the windshield may be inserted from the front, integral horizontally disposed seating surfaces at the upper and lower ends of said rabbet, a header at the upper ends of the posts comprising front and rear walls defining between them a space into which a portion of the windshield may move opening forwardly of said web portions, said posts also comprising separable sections entering said rabbets and fitting between said seats and having flanges overlying the edges of the windshield to confine it toward said webs and in alignment with the space in said header, said sections harmonizing with said body portions to appear in combination therewith as if unitary posts and being of such substantial construction as to contribute substantially to the strength of the posts.

5. In a vehicle body of the closed type having a sliding windshield, top-supporting posts, each comprising a metallic body portion having a transversely disposed web and a forwardly projecting reinforcing rib defining a rabbet into which the windshield may be inserted from the front, integral horizontally disposed seating surfaces at the upper and lower ends of said rabbet, a header at the upper ends of the posts comprising front and rear walls defining between them a space into which a portion of the windshield may move opening forwardly of said web portions, said posts also comprising separable sections entering said rabbets and fitting between said seats and having flanges overlying the edges of the windshield to confine it toward said webs and in alignment with the space in said header, said sections harmonizing with said body portions to appear in combination therewith as if unitary posts and being of such substantial construction as to contribute substantially to the strength of the posts, and securing means passing through said webs from the rear and engaging said sections without intersecting the exteriorly exposed surface thereof.

In testimony whereof, I have signed my name to this specification.

FREDERICK J. KUBLER.